United States Patent
Chiang et al.

(10) Patent No.: US 7,325,960 B2
(45) Date of Patent: Feb. 5, 2008

(54) STRUCTURE OF BAR-LIKE SIDE-EMITTING LIGHT GUIDE AND PLANAR LIGHT SOURCE MODULE

(75) Inventors: Ya-Hui Chiang, Jhongli (TW); Chiu-Ling Chen, Chu-tung Chen (TW); Shang-Ping Ying, Hsinchu (TW); Hung-Lieh Hu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 119 days.

(21) Appl. No.: 11/291,661

(22) Filed: Nov. 30, 2005

(65) Prior Publication Data

US 2007/0051811 A1    Mar. 8, 2007

(30) Foreign Application Priority Data

Sep. 6, 2005    (TW) .............................. 94130481 A

(51) Int. Cl.
    *F21V 7/04*    (2006.01)
(52) U.S. Cl. ..................... 362/628; 362/610; 362/615
(58) Field of Classification Search ............... 362/610, 362/26, 628, 615; 257/98
    See application file for complete search history.

(56) References Cited

U.S. PATENT DOCUMENTS

| | | | |
|---|---|---|---|
| 6,193,383 B1 * | 2/2001 | Onikiri et al. | 362/26 |
| 6,679,621 B2 | 1/2004 | West et al. | 362/327 |
| 6,972,439 B1 * | 12/2005 | Kim et al. | 257/98 |

* cited by examiner

*Primary Examiner*—Sandra O'Shea
*Assistant Examiner*—James W Cranson, Jr.
(74) *Attorney, Agent, or Firm*—J.C. Patents

(57) ABSTRACT

A bar-like side-emitting light guide suitable for re-directing an incident light beam such that the light beam emerges from each side of the structure. The guide structure includes a light guiding bar having an upper surface and a lower surface and extending along a longitudinal direction. On a cross-sectional plane of the light guiding bar, there is a first line interval on the upper surface. A second line interval, a third line interval and a coupling part are located at the lower surface. The coupling part couples with the second line interval and the third line interval. The distance from the lower surface of the light guiding bar to a reference plane of the upper surface varies such that the thickness gradually decreases from the coupling part to the sides. In addition, a planar light source module can be constructed by arranging the foregoing light guiding bars in parallel.

22 Claims, 5 Drawing Sheets

STRUCTURE OF BAR-LIKE SIDE-EMITTING LIGHT GUIDE AND PLANAR LIGHT SOURCE MODULE

CROSS-REFERENCE TO RELATED APPLICATION

This application claims the priority benefit of Taiwan application serial no.94130481, filed on Sep. 6, 2005. All disclosure of the Taiwan application is incorporated herein by reference.

BACKGROUND OF THE INVENTION

1. Field of the Invention

The present invention relates to an illuminating technique. More particularly, the present invention relates to a bar-like side-emitting light guide and a planar light source module constructed using a plurality of the bar-like side-emitting light guides.

2. Description of the Related Art

Beside a light source, most actual light source structures also include a light guiding structure, a dispersion plate and other optical components that guides the light from the light source into a light-emitting mode that fits the required function of the particular apparatus. For example, a planar light source is produced when a plurality of light emitting diodes are arranged together to form an original light source and the light emitted from these light emitting diodes are guided through a light guiding structure.

A planar light source has a variety of uses. For example, a planar light source can be used as a back light module in a planar display device. The light guiding structure can convert the light emitted from the light emitting diode (LED) into a planar form, covering a large area with the possibility of producing some light mixing effect. To convert the light emitted from the LED in the positive direction into side emitting light and produce the planar light effect, a conventional light guiding structure having a configuration as shown in FIG. 1 is used to surround the LED. As shown in FIG. 1, the conventional light guiding structure corresponds to the actual design of the LED. In fact, the LED is disposed at a center point F that passes through a central axis 43 of the light guiding structure. In the circularly symmetrical structure with respect to the central axis 43, a sharp protruding structure 102 and a bent base part 100 are disposed on each side of a cross-sectional plane. When the light guiding structure receives the light beam 104 emitted from the central point F, a portion of the light will be refracted by the base part 100 and the sharp protruding structure 102 and guided to the sides according to the incident locations. Then, as shown in FIG. 2, a plurality of the light guiding structures like the one in FIG. 1 is assembled together on a supporting bar 106. After that, a plurality of these supporting bars 106 are set up in parallel on a base plate 108 to form a conventional planar light source 108.

In the foregoing conventional light guiding structure, the design is for the disposition of singular light emitting diodes. The LED crystals are set up in such a way that the light from the LED is transformed to side emission through total reflection and refraction. However, if this type of LED package structure is used as the light source of a back light module, a large number of LED crystals and light guiding structures are required. As a result, the cost of producing a conventional planar light source is very high. Therefore, the manufacturers are seeking out other back light module designs having a lower production cost that still meet the required light emission quality.

SUMMARY OF THE INVENTION

Accordingly, at least one objective of the present invention is to provide a bar-like side-emitting light guide that can effectively guide at least a portion of the light from a light emitting body to one side and produce a uniform light mixing effect.

At least another objective of the present invention is to provide a planar light source module comprising a plurality of bar-like side-emitting light guides set in parallel to each other on a reflective base plate to produce a uniformly mixed planar light source.

To achieve these and other advantages and in accordance with the purpose of the invention, as embodied and broadly described herein, the invention provides a bar-like side-emitting light guide suitable for guiding a received light beam to emit from both sides. The light guide includes a light guiding bar having an upper surface and a lower surface and extending along a longitudinal direction. On a cross-sectional plane of the light guiding bar, there is a first line interval on the upper surface. A second line interval, a third line interval and a coupling part are located at the lower surface. The coupling part couples the second line interval and the third line interval. The distance from the lower surface of the light guiding bar to a reference plane of the upper surface varies such that the thickness gradually decreases from the coupling part to the sides.

According to the bar-like side-emitting light guide in one embodiment of the present invention, the coupling part on the cross-sectional plane is a cross point between the second line interval and the third line interval.

According to the bar-like side-emitting light guide in one embodiment of the present invention, the coupling part on the cross-sectional plane is a fourth line interval between the second line interval and the third line interval for connecting them together.

According to the bar-like side-emitting light guide in one embodiment of the present invention, the setup of the second line interval and the third line interval on the cross-sectional plane mainly serves to guide a large portion of the received light to the sides.

According to the bar-like side-emitting light guide in one embodiment of the present invention, there is a reflective layer for reflecting all or a portion of an incident light beam in an area that corresponds to the second line interval and the third line interval.

The present invention also provides a planar light source module. The planar light source module comprises a base plate, a plurality of the bar-like side-emitting light guide, a plurality of supporting structures and a plurality of light emitting devices. The supporting structures support the light guides and suspend them on the base plate such that the light guides are disposed in a predetermined direction. The supporting structures also have lower surfaces facing the base plate. The light emitting devices are disposed on the base plate underneath the corresponding light guides.

According to the planar light source module in one embodiment of the present invention, the base plate is a diffusion plate capable of reflecting any light falling on the diffusion plate.

According to the planar light source module in one embodiment of the present invention, the base plate is a reflection plate capable of reflecting any light falling on the reflection plate.

According to the planar light source module in one embodiment of the present invention, the supporting structure is a transparent body or has a reflective surface.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
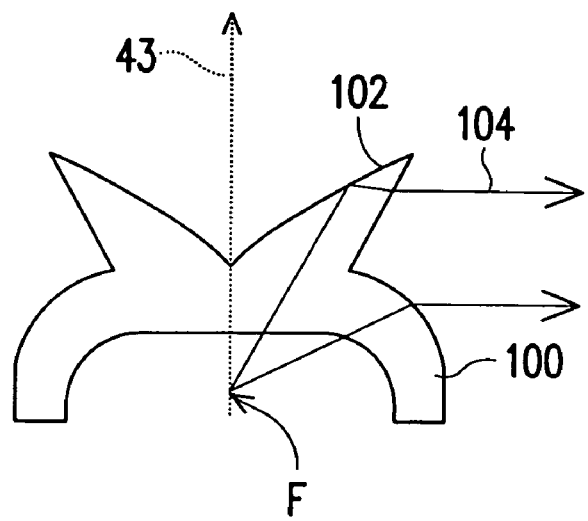
FIG. 1 is a schematic cross-sectional view of a conventional light guide.
Figure 2:
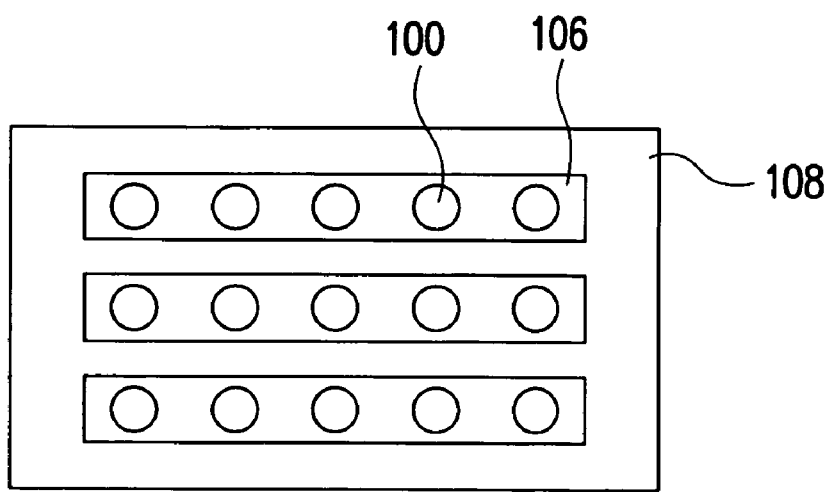
FIG. 2 is a top view of a conventional planar light source module.

Reference will now be made in detail to the present preferred embodiments of the invention, examples of which are illustrated in the accompanying drawings. Wherever possible, the same reference numbers are used in the drawings and the description to refer to the same or like parts.

The bar-like side-emitting light guide in the present invention changes a direction-pointing light source into a side-emitting the light source suitable for serving as the light mixing module of a large LED planar light source. The large planar light source module includes at least a light source, a bar-like side-emitting light guide and a diffusion plate. With this setup, it is possible to provide a uniformly mixed light source at a short distance and reduce the production cost with a simpler production process at the same time.

At present, the large planar light source using a plurality of LED light sources and having a package design with fully reflective lenses for producing side-emitting light sources can provide a better light mixing effect. However, this package design also increases processing complexity and overall production cost. Accordingly, a large planar light source with uniform light mixing capacity and a simple LED package design that incorporates the bar-like side-emitting light guide of the present invention is provided. Furthermore, each bar-like side-emitting light guide can deploy more than one light emitting diode so that cost control is more flexible. Moreover, the bar-like side-emitting light guide has a very simple structure and is easy to fabricate. Thus, for a large planar LED light source with a significant LED packaging cost, the present invention is able to reduce the production cost and simplify the assembling process substantially. In addition, the compatibility of the LED light sources in the present invention is relatively high and the light from the LED within the large planar light source can be mixed together and homogenized within a very short distance. In the following, a few embodiments are used to describe the present invention. However, this should by no means limit the scope of the present invention as such.

Figure 3:
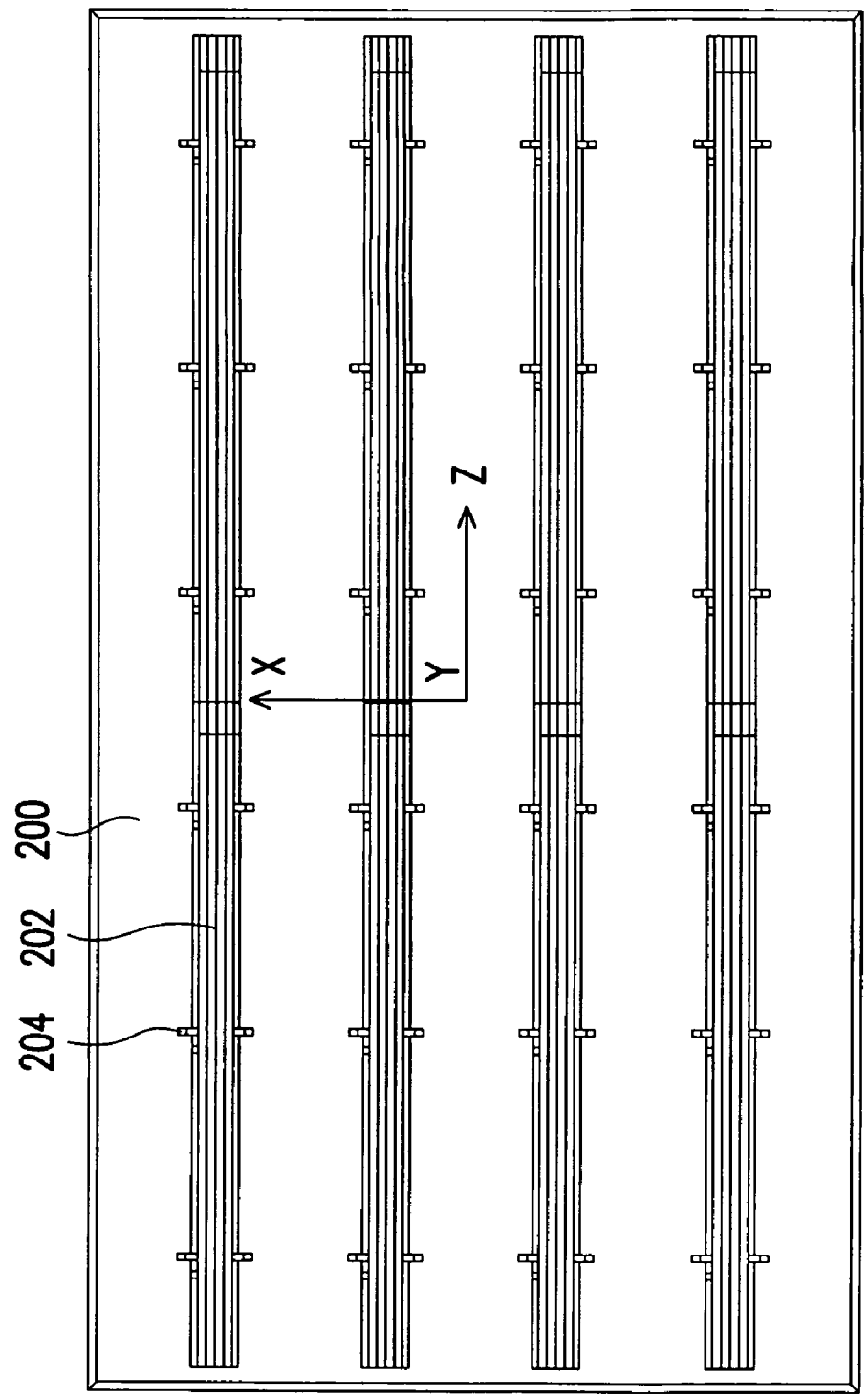
FIG. 3 is a plane bottom view of a planar light source with bar-like side-emitting light guides, according to one embodiment of the present invention.

FIG. 3 is a plane bottom view of a planar light source with bar-like side-emitting light guides according to one embodiment of the present invention. As shown in FIG. 3, a plurality of bar-like side-emitting light guides 202 is disposed on a base plate 200. In FIG. 3, an XYZ coordinate axis system is set up as a reference and the structure is obtained by looking along the Y direction. The bar-like side-emitting light guides 202 are supported by a plurality of supporting structure 204 and these bar-like side-emitting light guides 202 are preferably set up on the base plate 200 in parallel to each other. Nevertheless, due to practical considerations, not every one of the bar-like side-emitting light guides 202 needs to be parallel to each other. Some of the bar-like side-emitting light guides can be disposed in a predefined direction according to a particular design.

Figure 4:
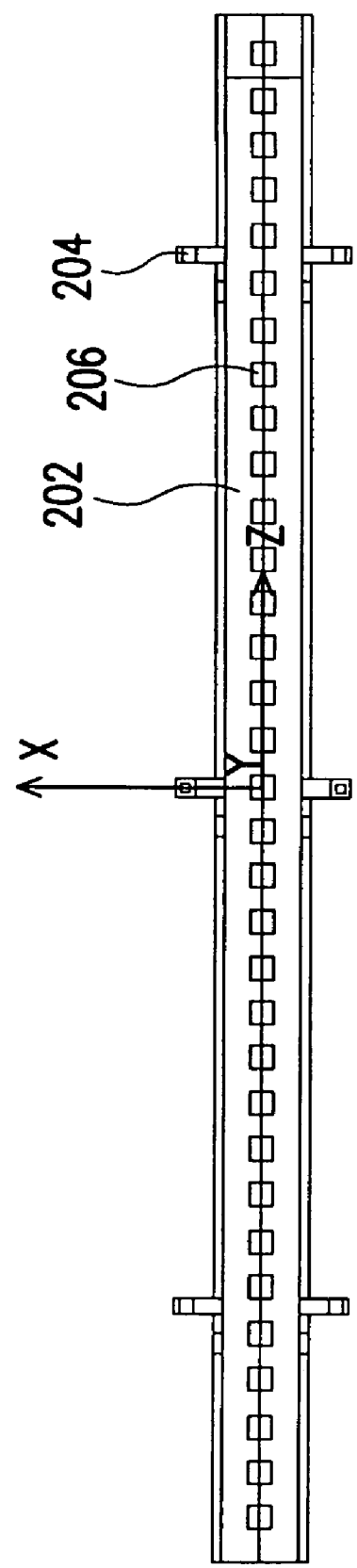
FIG. 4 is a diagram, showing the relative positions of a plurality of light emitting diodes in a bar-like side-emitting light guide shown in FIG. 3.

FIG. 4 is a diagram showing the relative positions of a plurality of light emitting diodes in the bar-like side-emitting light guide 202 shown in FIG. 3. As shown in FIG. 4, the light emitting diodes 206 are disposed underneath the bar-like side-emitting light guide 202. Preferably, the light emitting diodes 206 are uniformly disposed along the longitudinal central axis. However, this is only one of the methods of disposing the light emitting diodes 206. Furthermore, the number of light emitting diodes 206 deployed in the bar-like side-emitting light guide 202 may vary according to the actual requirements. In particular, the number of light emitting diodes within the light guide 202 can be decreased to reduce the production cost.

Figure 5:
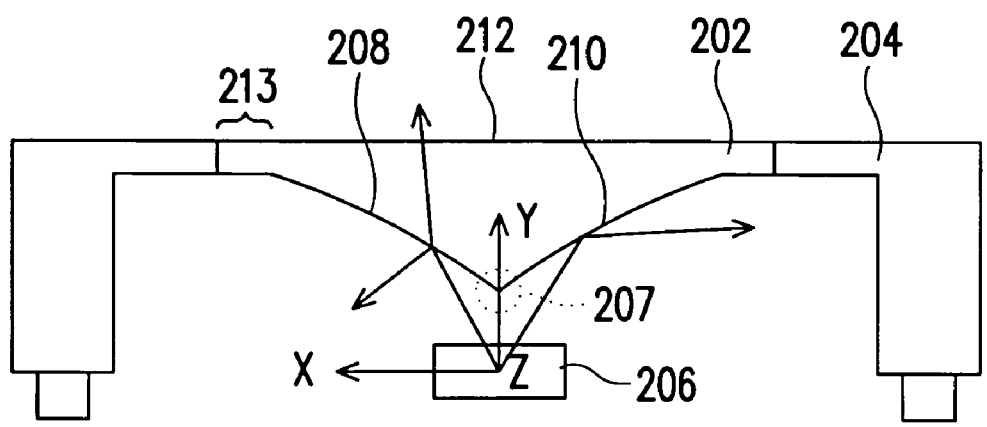
FIG. 5 is a cross-sectional view, showing one type of possible structure along an XY plane passing through the supporting structure and the LED shown in FIG. 4.

FIG. 5 is a cross-sectional view showing one type of possible structure along an XY plane passing through the supporting structure 204 and the LED 206 shown in FIG. 4. As shown in FIG. 5, the bar-like side-emitting light guide 202 is suspended over the base plate 200 (refer to FIG. 3) through the supporting structures 204. A detailed description of the structure and function of the base plate 200 and the supporting structure 204 is provided a little later. Here, the structure of the bar-like side-emitting light guide 202 is explained first.

Typically, the bar-like side-emitting light guide 202 has an upper surface and a lower surface extending in a longitudinal direction, that is, for example, along the Z-axis. The cross-sectional plane along the XY surface of the bar-like side-emitting light guide 202 includes a line interval 212 on the upper surface. In the present embodiment, the line interval 212 is a straight line, for example. In other words, the upper surface is a flat plane. This flat surface also defines a reference plane.

The lower surface of the bar-like side-emitting light guide 202 comprises a line interval 208 and a line interval 210. The two line intervals cross over at a coupling part 207, which is a sharp end portion. The LED 206 is disposed underneath the coupling part 207, for example. The line interval 208 and the line interval 210 are designed as curved lines so that the light emitted from the LED 206 is guided to the sides whose guiding mechanism will be explained later. According to the characteristic curve of the line intervals 208 and 210, the distance from the lower surface of the bar-like side-emitting light guide to the upper surface varies in such a way that the thickness of the structure gradually decreases from the coupling part 207 to the sides. It should be noted here that the 'curve' is a straight line if the curve has a curvature of zero. In addition, according to the actual design, an area 213 having a uniform thickness can be maintained near the edges. Due to the reflection at the line interval 208 and the line interval 210, most of the light emitted from the LED 206 will be reflected and guided to the sides. The surface of the corresponding line interval 208 and the line interval 210 in the light guide 202 can be made to reflect light by various conventional ways. For example, the surface of the line intervals 208 and 210 can be made to reflect light by choosing a material with a high reflective coefficient to construct the light guide 202. Alternatively, a reflective layer may be directly formed over all or part of the surface. If the reflectivity of the line intervals 208 and 210 is achieved by means of a material with a high reflective coefficient, a portion of the light will still penetrate through. The transmission of part of the light through the light guide 202 can be used as a design parameter for adjusting the intensity and the uniformity of the light distribution. The reason is that the intensity of light in the up direction directly above the light guide 202 will be weaker if all the light are guided to the sides and then reflected through the base plate into planar light. Therefore, some adjustments are required.

Figure 6:
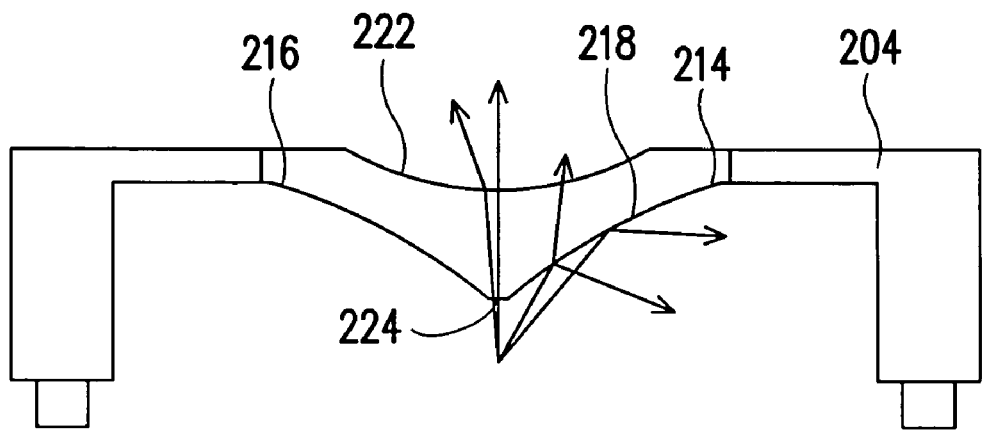
FIG. 6 is a cross-sectional view, showing another type of possible structure along an XY plane passing through the supporting structure and the LED shown in FIG. 4.

FIG. 6 is a cross-sectional view showing another type of possible structure along an XY plane passing through the supporting structure 204 and the LED 206 shown in FIG. 4. As shown in FIG. 6, the design of the line interval 212 and the sharp end of the coupling part 207 in FIG. 5 are slightly modified. The line interval 216 and the line interval 218 on the lower surface of bar-like side-emitting light guide 214 can be identical to the aforesaid line interval 208 and the interval 210 respectively. However, the coupling part 224 between the line interval 216 and the line interval 218 can also be another line interval. The coupling part 224 allows some light to enter the bar-like side-emitting light guide 214. Furthermore, the line interval 222 on the upper surface of the light guide 214 can be designed to have a slightly concave profile so that light can be dispersed in that area to form a slightly divergent beam and produce a more uniform light intensity distribution.

The designs in FIGS. 5 and 6 can be combined together or equivalently modified in a similar manner instead of limited to the exact designs shown in FIGS. 5 and 6. In other words, the curvature of the line intervals 216, 218, 222 and 224 can be suitably adjusted to produce the correct light guide 214. As a result, the light guide 214 and the base plate together can produce a planar light module with uniform light mixing capability.

Figure 7:
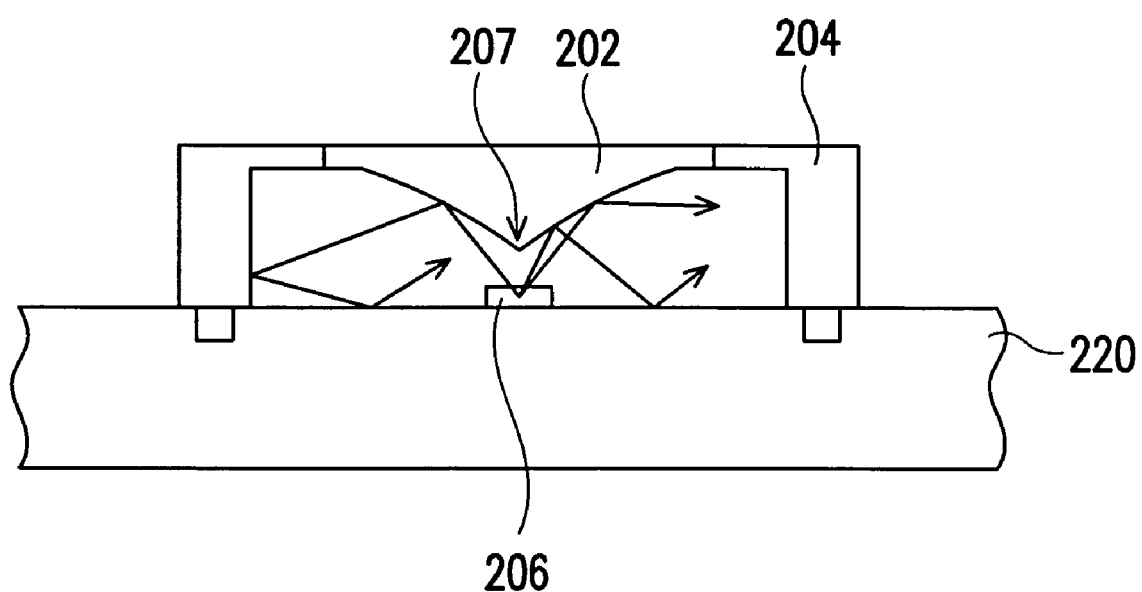
FIG. 7 is a schematic cross-sectional view of a portion of a planar light source module, according to the embodiment of the present invention.

The following is an explanation for the operating mechanism for the light guide 214 and base plate assembly. FIG. 7 is a schematic cross-sectional view of a portion of a planar light source module according to the embodiment of the present invention. As shown in FIG. 7, a bar-like side-emitting light guide 202 is suspended over a base plate 220 through a supporting structure 204. The supporting structure 204 is fixed above the base plate 220 at a predetermined location. An LED 206 is disposed underneath a coupling part 207, for example. The base plate 220 has a high reflectivity and can be a diffusion plate or a reflective plate, for example. The diffusion plate is capable of mixing the incoming light and forwarding most of the light straight up. Therefore, the base plate 220 is preferably a diffusion plate. However, the base plate 220 can also be a reflective plate. When light is deflected by the bar-like side-emitting light guide 202 to enter the reflective base plate 220, the light will be reflected out again or guided into a neighboring bar-like side-emitting light guide 202. After a multiple of such light mixing travels, the desired light mixing effect is achieved.

In addition, the improvement in the mixing effect will shorten the mixing distance. Hence, the height of the supporting structure 204 need not be too high. Furthermore, the supporting structure 204 can be fabricated using a transparent material to reduce the barrier to the passing light. However, the supporting structure 204 can have a reflective design, for example, having a reflective surface for reflecting and reusing a portion of the light. The reflective surface is formed, for example, by applying a metal electroplating technique.

Furthermore, if the LED is not a direct producer of white light, the light guide 202 in the present invention can be used to mix the lights of different colors so that the effect of white light or other color light is produced.

The aforementioned LED is only one preferred embodiment of the present invention. In general, the present invention can be applied to other types of light emitting devices. Although the bar-like structure used in the illustration is a straight and equal-width bar, the bar-like structure can be a curve with a cross-sectional width changing along the curve according to the actual design instead of an equal width all along. In other words, the bar-like structure can have any design as long as the line intervals in the aforementioned cross-sectional plane are able to define a curve surface structure for guiding the light.

In summary, the light guiding structure of the present invention is fabricated using a bar-like structure. Hence, the fabrication process can be simplified and the number of LED required can be reduced. Thus, the present invention can lower the cost of manufacturing and simplify the process for producing large planar light modules.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bar-like side-emitting light guide suitable for guiding a received light and diverting the light to emit from two opposite sides, comprising:
    a light guiding bar having an upper surface and a lower surface and extending along a longitudinal direction, wherein a cross-sectional plane of the light guiding bar includes:
    a first line interval on the upper surface; and
    a second line interval, a third line interval and a coupling part on the lower surface such that the second line interval and the third line interval are connected through the coupling part,
    wherein a distance from the lower surface to a reference plane in the upper surface of the light guiding bar varies in such a way that a distribution of distance decreases from the coupling part toward the sides.

2. The bar-like side-emitting light guide of claim 1, wherein the coupling part on the cross-sectional plane is a crossing point between the second line interval and the third line interval.

3. The bar-like side-emitting light guide of claim 1, wherein the coupling part on the cross-sectional plane is a fourth line interval disposed between the second line interval and the third line interval, for connecting the second line interval and the third line interval together.

4. The bar-like light-emitting light guide of claim 3, wherein the fourth line interval is a curve line or a straight line.

5. The bar-like light-emitting light guide of claim 1, wherein the first line interval, the second line interval or the third line interval on the cross-sectional plane are a curve line or a straight line.

6. The bar-like side-emitting light guide of claim 1, wherein the second line interval and the third line interval on the cross-sectional plane are so arranged that a substantial portion of the received light is guided to the respective sides.

7. The bar-like side-emitting light guide of claim 1, wherein the lower surface of the light guiding bar has a reflective layer within the area of the second line interval and the third line interval so that all or part of the incident light are reflected.

8. The bar-like side-emitting light guide of claim 1, wherein the coupling part permits a small portion of the received light to enter the light guide and travel out from the upper surface.

9. The bar-like side-emitting light guide of claim 1, wherein the light guide includes a material having a high transmission coefficient.

10. A planar light source module, comprising:
a base plate;
a plurality of bar-like side-emitting light guides, wherein each of the bar-like side-emitting light guides comprises:
a light guiding bar having an upper surface and a lower surface and extending along a longitudinal direction, wherein the a cross-sectional plane of the light guiding bar includes:
a first line interval on the upper surface; and
a second line interval, a third line interval and a coupling part on the lower surface such that the second line interval and the third line interval are connected through the coupling part, wherein a distance from the lower surface to a reference plane in the upper surface of the light guiding bar varies in such a way that a distribution of the distance decreases from the coupling part toward the sides;
a plurality of supporting structures for supporting the light guides and suspending the light guide above the base plate in a predefined direction, wherein the lower surface of the supporting structure faces the base plate; and
a plurality of light emitting devices disposed on the base plate and distributed underneath the respective light guides.

11. The planar light source module of claim 10, wherein the base plate includes a diffusion plate or a reflective plate for reflecting a light falling on the diffusion plate.

12. The planar light source module of claim 10, wherein the coupling part on a cross-sectional plane of the light guide is a crossing point between the second line interval and the third line interval.

13. The planar light source module of claim 10, wherein the coupling part on the cross-sectional plane of the light guide is a fourth line interval between the second line interval and the third line internal that connects the two together.

14. The planar light source module of claim 13, wherein the fourth line interval is a curve line or a straight line.

15. The planar light source module of claim 10, wherein the first line interval, the second line interval or the third line interval in the cross-sectional plane of the light guide are a curve line or a straight line.

16. The planar light source module of claim 10, wherein the second line interval and the third line interval on the cross-sectional plane of the light guide are so arranged that a substantial portion of the received light is guided to the sides.

17. The planar light source module of claim 10, wherein the coupling part on the cross-sectional plane of the light guide permits a small portion of the received light to enter the light guide and emerge from the upper surface.

18. The planar light source module of claim 10, wherein the light guide is fabricated using a material having a high transmission coefficient.

19. The planar light source module of claim 10, wherein the supporting structure has a transparent body or a reflective surface.

20. The planar light source module of claim 10, wherein the lower surface of the light guide bar has a reflective layer within the area of the second line interval and the third line interval for reflecting all or part of any incident light.

21. The bar-like light-emitting light guide of claim 1, wherein the first line interval includes a curve line portion.

22. The planar light source module of claim 10, wherein the first line interval includes a curve line portion.

* * * * *